Figure 1:
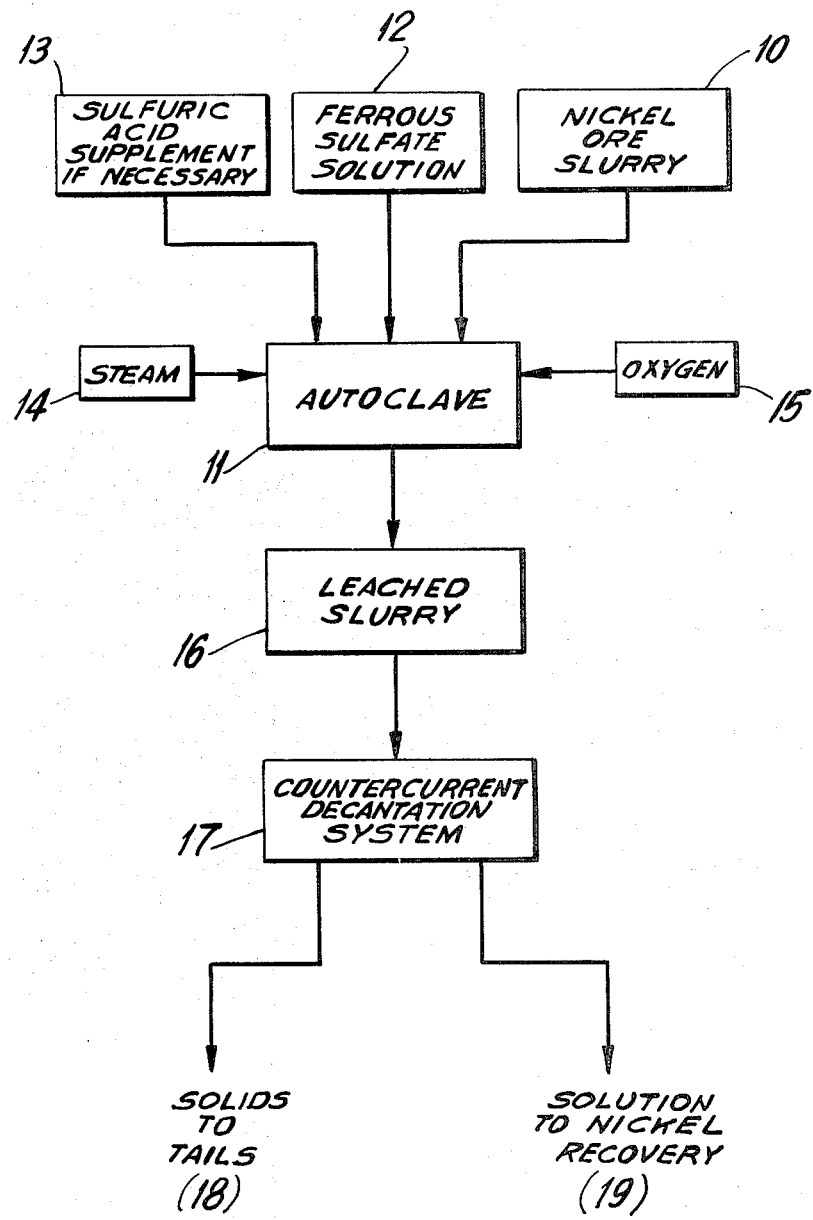

United States Patent [19]
Michal

[11] 3,761,566
[45] Sept. 25, 1970

[54] LEACHING OF NICKEL LATERITIC ORES WITH WASTE IRON SULFATE SOLUTIONS

[75] Inventor: Eugene J. Michal, Wilton, Conn.

[73] Assignee: American Metal Climax, Inc., New York, N.Y.

[22] Filed: Sept. 13, 1971

[21] Appl. No.: 179,765

[52] U.S. Cl.................... 423/141, 75/115, 75/119, 423/146, 423/150
[51] Int. Cl....................... C22d 23/00, C01g 51/10
[58] Field of Search..................... 75/115, 119, 121; 423/138, 141, 146, 150

[56] References Cited
UNITED STATES PATENTS

| | | | |
|---|---|---|---|
| 2,775,517 | 12/1956 | Mancke | 75/119 |
| 513,490 | 1/1894 | Emmens | 75/120 |
| 1,834,960 | 12/1931 | Mitchell | 423/109 X |
| 2,292,507 | 8/1942 | Brooks | 75/115 |

Primary Examiner—Oscar R. Vertiz
Assistant Examiner—Hoke S. Miller
Attorney—Kasper T. Serijan

[57] ABSTRACT

Oxidic nickel or nickel-cobalt containing materials, e.g. lateritic nickel ores, are leached at superatmospheric pressure and elevated temperature with ferrous sulfate under conditions in which the ferrous sulfate is oxidized to ferric sulfate which is caused to hydrolyze to provide free sulfuric acid for leaching the ore. The invention lends itself most suitably to a process in which the sulfuric acid leaching of oxidic titaniferous iron-containing ore is coordinated with the leaching of oxidic nickel ore, such that the iron sulfate solution resulting from the titanium leach is employed as the leaching solution for the nickel ore by utilizing the hydrolysis of ferric sulfate under superatmospheric pressure and elevated temperature to regenerate free sulfuric acid in situ for leaching the ore, whereby the same leaching reagent is employed economically in the sequential leaching of both the titanium and nickel ores.

15 Claims, 3 Drawing Figures

INVENTOR.
EUGENE J. MICHAL
BY
Kasper T. Serijan
ATTORNEY

LEACHING OF NICKEL LATERITIC ORES WITH WASTE IRON SULFATE SOLUTIONS

This invention relates to the hydrometallurgical recovery of nickel and cobalt from oxidic nickeliferous materials and, in particular, to a method of utilizing waste ferrous sulfate solutions as a source of leaching reagent, the disposal of which would otherwise present a pollution problem. The invention is preferably directed to a method for coordinating the leaching of oxidic titaniferous iron-containing ores with the leaching of oxidic nickel ores, e.g., lateritic ores, wherein the iron sulfate resulting from the titanium leach is utilized economically as a source of reagent to effect the leaching of the nickel.

STATE OF THE ART

In one method of leaching lateritic or limonitic nickel ore using sulfuric acid as the reagent, the finely divided ore (e.g. minus 20 mesh) is pulped to about 40 percent solids, following which it is preheated to about 160°F. to 180°F and the nickel and cobalt selectively leached with sulfuric acid at elevated temperature and superatmospheric pressure (e.g. 475°F [246°C] and 525 psig) to solubilize about 95 percent or more of the contained nickel and cobalt.

The leached pulp is cooled and then washed by countercurrent decantation, with the washed pulp going to tailings. The acid leach liquor is thereafter processed for nickel and cobalt recovery, for example by neutralization with coral mud ($CaCO_3$) or magnesium oxide, to a pH of 2.5 to 2.8 and the product liquor containing about 4 to 6 grams of nickel per liter is then subjected to sulfide precipitation by preheating the leach liquor and injecting $H_2S$ into an autoclave maintained at a superatmospheric pressure of 150 psig and a temperature of 250°F (121°C), nickel sulfide seed being added at the feed end.

Considering that most oxidic nickel ores contain a small amount of nickel (e.g. 1 to 2 percent) and even much smaller amounts of cobalt, reagent costs are high and may vary in accordance to the amount of acid consuming constituents present in the ore. Thus, the amount of acid consumed may vary from 0.15 to 0.3 or even to 0.4 pound of acid per pound of ore treated. Generally, it is preferred that the amount of acid consumed not exceed 0.15 to 0.25 per pound of ore treated.

PROBLEM CONFRONTING THE ART

Sulfuric acid is a common leaching agent and is used in the leaching of other ores, such as oxidic titaniferous iron-containing ores (e.g. ilmenite). A by-product of one titanium leaching process is ferrous sulfate which, because of its low value compared to the more expensive relatively pure titanium oxide product is disposed of as waste, since the cost of recovering sulfuric acid therefrom is not sufficiently economically attractive under the circumstances.

Waste ferrous sulfate solutions are produced by other chemical methods of processing, such as waste ferrous sulfate solutions resulting from the use of pickling solutions, that is, sulfuric acid pickling solutions used in the pickling of steel products and the like.

However, in recent years, statutory limitations have been imposed by government agencies on the disposal of such waste materials because of the pollution problem they present to nearby surface and ground waters, plant life, animal life and the like. It thus would be desirable if such waste by-product solutions could be utilized economically in some kind of recycling process in the carrying out of other processes, whereby the waste materials would be consumed and its disposal as waste to the environment substantially reduced to harmless levels if not avoided.

A method has been proposed for utilizing certain types of hydrolyzable metal sulfate solutions as a leaching agent, but such solutions have been limited to sulfate salts capable of hydrolyzing at a relatively low pH. The leaching of nickel ore requires a relatively low pH (e.g. a pH of up to about 1) to assure at least 90 percent dissolution of the nickel. A particular sulfate solution proposed is ferric sulfate, the use of such solution being described in Australian Pat. No. 228,454 dated May 27, 1960.

However, the ferrous sulfate solutions referred to hereinabove as a by-product of titanium leaching, or pickling solutions, and the like, are stable over a wider pH range and hydrolyze at pH levels which are not conducive to the efficient leaching of nickel ores.

It would thus be desirable to provide a method whereby waste ferrous sulfate solutions can be utilized to effect the economic leaching of oxidic nickel-containing materials.

OBJECTS OF THE INVENTION

It is thus an object of the invention to provide an economic method of leaching oxidic nickel-containing materials, e.g. lateritic nickel ores and the like, utilizing ferrous sulfate solutions.

Another object is to provide a method of coordinating the sulfuric acid leaching of oxidic titaniferous iron-containing ore or concentrate with the leaching of oxidic nickel-containing materials, such as low nickel ores, wherein the by-product waste ferrous sulfate resulting from the titanium leach is utilized in economically recovering the nickel from oxidic nickel-containing materials.

Figure 2:
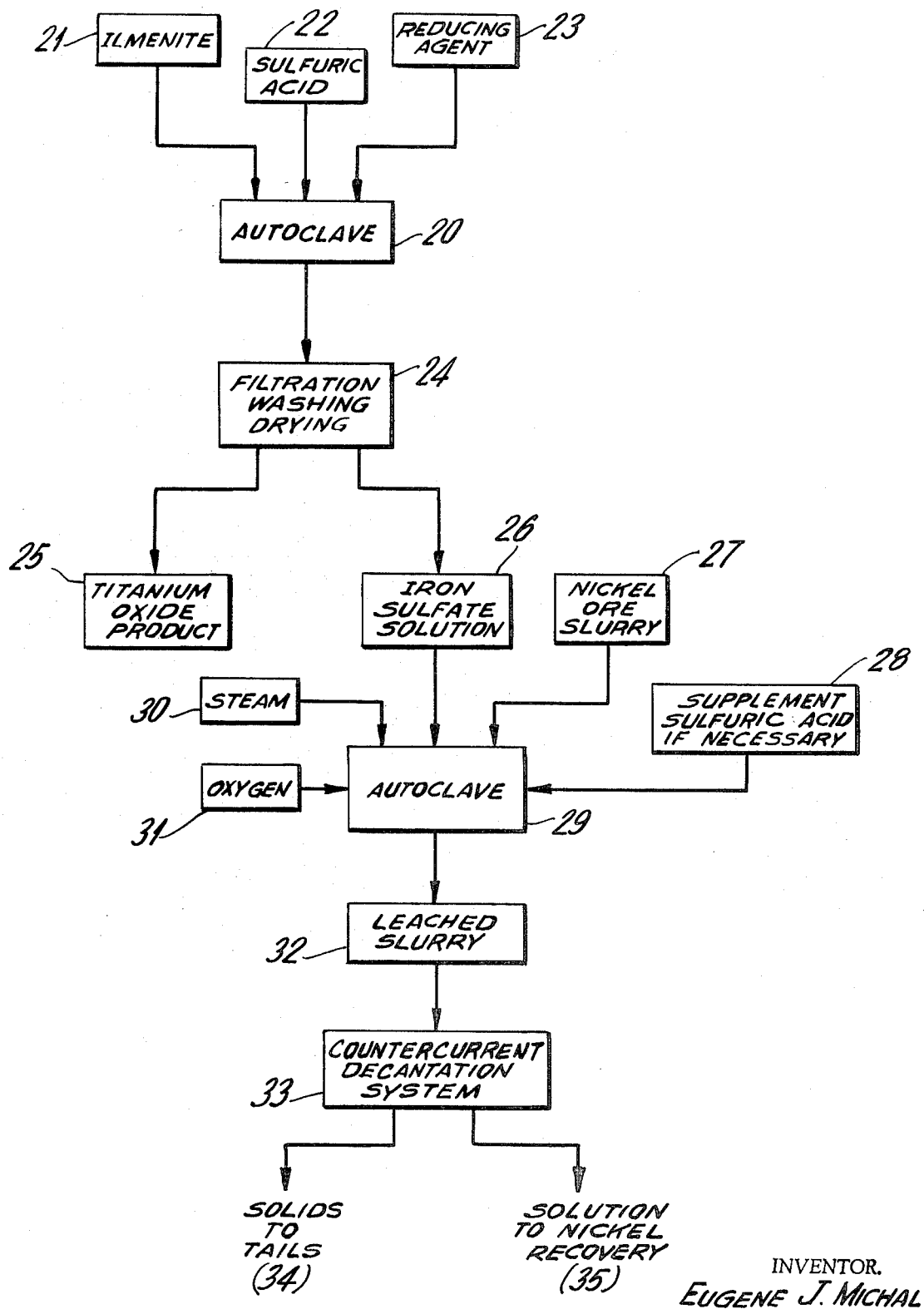
Figure 3:
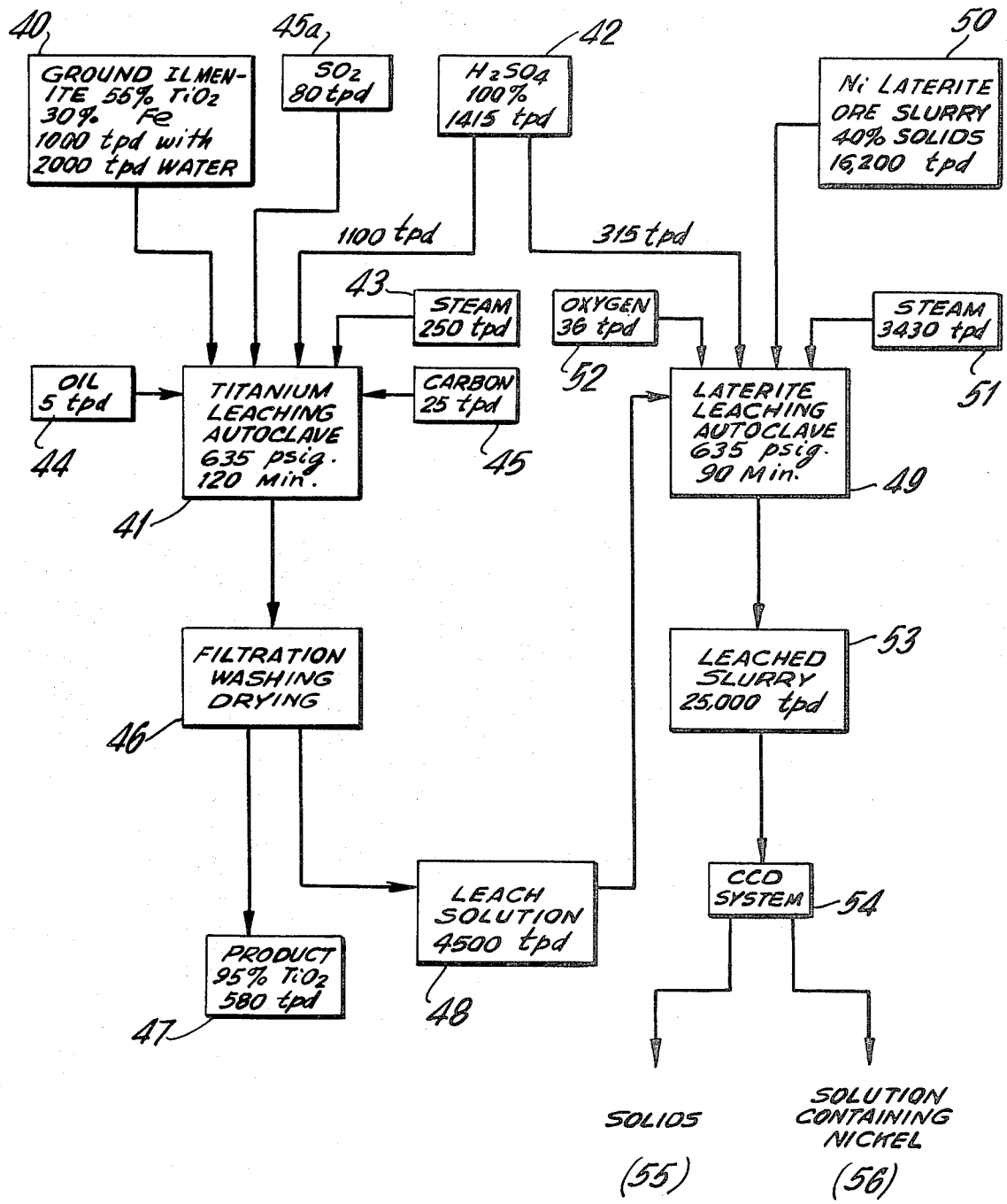

These and other objects will more clearly appear when taken in conjunction with the following disclosure and the accompanying drawings, wherein:

FIG. 1 is a flow sheet illustrating one embodiment in utilizing ferrous sulfate in leaching nickel ore;

FIG. 2 depicts broadly a flow sheet showing another embodiment in which the leaching of an oxidic titaniferous iron-containing ore, e.g. ilmenite, is coordinated with the leaching of an oxidic nickel ore; and FIG. 3 is a flow sheet showing in more detail the coordinated leaching of titanium and nickel ores starting with the same reagent which is sequentially used in carrying out both leaching processes, supplemented sulfuric acid being additionally used in the leaching of nickel ore.

STATEMENT OF THE INVENTION

In its broad aspects, the invention resides in a method of leaching oxidic nickeliferous materials with a ferrous sulfate solution under oxidizing conditions at superatmospheric pressure and elevated temperature effective to convert ferrous sulfate to ferric sulfate and cause it to hydrolyze in situ to provide free sulfuric acid for leaching out the nickel and cobalt. The invention is particularly useful in the utilization of waste or by-product ferrous sulfate, the disposal of which would normally present the problem of environmental pollution.

The ferrous sulfate may be used alone as the leaching agent or supplemented with sulfuric acid. Whether the ferrous sulfate is used alone or in combination with free sulfuric acid, economic advantages are obtained compared to using sulfuric acid alone. Economic advantages are particularly obtained where the leaching of oxidic iron-containing titaniferous ore is coordinated with the leaching of oxidic nickel ore or other oxidic nickel-containing materials in that the same starting reagent is used sequentially in the leaching of both ores, the sulfuric acid consumed in the titanium leach as iron sulfate being subsequently regenerated by the hydrolysis of ferric sulfate during the nickel leach. Thus, the same amount of sulfuric acid results in the recovery of both titanium and nickel values as opposed to only one of these elements where the leaching of each is uncoordinated with respect to the other.

The ferrous sulfate may be obtained from any source. Thus, in the case where ferrous sulfate is available, its use in leaching nickel comprises, forming a slurry of the oxidic nickel material in the finely divided state, adding to the slurry an amount of ferrous sulfate having a combined sulfuric acid content calculated to provide free sulfuric acid, which, together with any free sulfuric acid which may be present, is in stoichiometric excess of the sulfuric acid requried to leach the oxidic nickel-containing material, and then leaching the slurry at superatmospheric pressure and elevated temperature under conditions in which the ferrous sulfate is oxidized to ferric sulfate which, upon hydrolysis at the prevailing conditions of pressure, temperature and pH, provides the required amount of free acid to leach a major portion of the nickel present. The conditions are preferably achieved by adding oxygen under pressure together with high pressure steam.

It is believed that the addition of oxygen under pressure results in the following reaction:

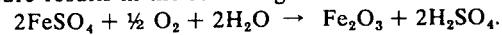
$2FeSO_4 + \frac{1}{2} O_2 + 2H_2O \rightarrow Fe_2O_3 + 2H_2SO_4$.

As will be noted, one mole of ferrous sulfate following conversion to ferric sulfate forms, after hydrolysis of the ferric sulfate, one mole of free sulfuric acid.

As stated hereinabove, the ferrous sulfate may be used alone or in combination with supplemental amounts of sulfuric acid.

The invention as applied to the coordinated leaching of oxidic titaniferous iron-containing and oxidic nickel-containing materials resides in first forming a slurry of the titanium-containing material with sulfuric acid, the amount of acid used being at least sufficient to solubilize substantially all of the iron present. The slurry is then heated in an autoclave under superatmospheric pressure and elevated temperature for a time sufficient to solubilize the iron present and convert the titanium values to substantially insoluble hydrated titanium oxide, the amount of sulfuric acid added being at least sufficient to combine with the iron to form iron sulfate solution.

The resulting iron sulfate solution is separated from the insoluble hydrated titanium oxide and then combined with oxidic nickel-containing material in the finely divided state, the amount of iron sulfate present having a combined acid content which, together with any free sulfuric acid which may be present, provides a total acid content or sulfuric acid equivalent in stoichiometric excess of the sulfuric acid required to leach the nickel values from the ore.

The nickel leaching is carried out at superatmospheric pressure and elevated temperature with the iron sulfate in the form of ferric sulfate, which upon hydrolysis at the prevailing conditions of pressure, temperature and pH, provides the required amount of free sulfuric acid necessary to leach at least a major portion of the nickel from the oxidic nickel-containing material.

As illustrative of the ferrous sulfate leaching of nickel oxide ore, reference is made to the flow sheet of FIG. 1 which shows schematically nickel ore slurry 10 being fed into autoclave 11, ferrous sulfate solution 12 being then fed to the autoclave with or without sulfuric acid supplement 13, the combined acid content of the ferrous sulfate together with any free acid which may be present being at least sufficient to leach the major portion of nickel values in the ore. Steam 14 is added under pressure together with oxygen to provide a total pressure of, for example, 700 psig or over, about 150 psig being attributed to the oxygen partial pressure, the mean temperature being about 250°C. The leach is carried out for about 1½ hours, the leached slurry 16 being then subjected to countercurrent decantation 17 where the solids (18) are sent to tails and the nickel leach solution sent to recovery.

As illustrative of a specific embodiment of the invention as carried out in accordance with the flow sheet of FIG. 1, the following example is given:

EXAMPLE 1

About 400 grams of oxidic lateritic nickel ore containing 1.06% Ni, 0.1% Co. 46% Fe, 3.3% Al, 2.2% Cr, 0.65% Mn, 0.54% Mg, and including residuals such as Cu, Ca and $SiO_2$, and the balance substantially combined oxygen were mixed with 299.6 grams of water and the whole slurry heated to 240°C. To the slurry were added 443 grams of solution containing 57.6 grams of free $H_2SO_4$ and 57.6 grams of $FeSO_4$ corresponding to 37.2 grams of combined $H_2SO_4$.

The acid-to-ore ratio by weight based on both the free and combined acids was about 0.24. In leaching the slurry, the mixture was subjected to a total of 1,100 psig, about 800 psig being attributed to high pressure steam and 300 psig being attributed to oxygen partial pressure at about 240°C. The ferrous sulfate was oxidized to ferric sulfate which hydrolyzed to provide additional free sulfuric acid. The leaching time was 1½ hours. The final solution after filtration had a nickel content of 5.6 gpl and also contained 0.13 gpl Co, 0.76 gpl Fe, among small amounts of Al, Mn, Cr, etc. The final pH of the solution was about 0.5.

The overall recovery of nickel, including the wash water, was about 94.8%. This recovery compares favorably with a leach solution of only sulfuric acid (acid-to-ore ratio by weight of about 0.23) in which the nickel recovery was 95.2 percent.

Another example is given as follows.

EXAMPLE 2

In this example, 400 grams of ore as in Example 1 were mixed with 595.7 grams of water and 147 grams of $FeSO_4$ (equivalent to 95 grams $H_2SO_4$) and the slurry heated to 250°C. The slurry was pressure leached at a total pressure of 850 psig, about 750 psig being attributed to steam and 100 psig to oxygen partial pressure. The leach was conducted for 1½ hours, the final pH reaching 0.7. The ferrous sulfate was oxidized to ferric sulfate which hydrolyzed to provide free acid to leach the nickel values from the ore. The overall recovery of nickel was 88.5 percent. The equivalent acid-to-ore weight ratio was 95 to 400 or about 0.235 to 1.

As stated hereinbefore, the invention is particularly applicable to the coordinated leaching of both titanium and nickel ores. Broadly, the coordinated leaching process may comprise the flow sheet of FIG. 2. Thus, referring to the schematic of FIG. 2, an autoclave 20 is shown into which is fed ilmenite concentrate 21 and sulfuric acid 22, the amount of sulfuric acid being at least sufficient to dissolve substantially the iron present in the concentrate while forming an insoluble titanium oxide hydrate. Preferably some excess sulfuric acid over that required to dissolve iron and other soluble ore components is used so that some free acid will remain after leaching. A reducing agent 23 is added to the charge to assure the formation of soluble ferrous sulfate. The reaction in the autoclave is carried out at superatmospheric pressure, e.g., about 500 to 2,000 psig, and at an elevated temperature, e.g., about 240°C to 340°C, for a time sufficient (e.g. one-half to 1 hour) to dissolve out the iron and form insoluble titanium oxide hydrate.

The resulting reaction product is filtered, washed and dried at 24 to provide a titanium oxide product 25 and a ferrous sulfate solution 26. The iron sulfate solution is analyzed for its ferrous sulfate content and the sulfuric acid equivalent determined. An amount of nickel ore slurry 27 is proportioned according to the free and combined acid present in the ferrous sulfate solution or to that acid plus any supplemental free sulfuric acid 28 added where necessary, the total acid available being in stoichiometric excess to the amount of acid required to leach at least the nickel and cobalt present.

The iron sulfate 26, nickel slurry 27 and optionally sulfuric acid 28 are fed to autoclave 29. Steam 30 and oxygen 31 are fed under pressure to the autoclave, the reaction being carried out at an elevated temperature, e.g. 250°C. Following completion of the high pressure leaching, the leached slurry 32 is washed by countercurrent decantation 33 to provide solids 34 which are disposed of as tails and a nickel solution 35 which is sent to nickel recovery.

EXAMPLE 3

In carrying out the coordinated titanium and nickel leaching process on a large scale, the process outlined in the flow sheet of FIG. 3 may be employed. The quantities of the materials are stated in tons per day (tpd).

Thus, 1,000 tons per day of finely ground ilmenite concentrate 40 containing about 55% $TiO_2$ and 30% iron are fed into autoclave 41 and slurred with 1100 tpd of sulfuric acid as a solution 42 containing 98% by weight of sulfuric acid. Simultaneously, 250 tpd of steam 43 are added together with 5 tpd of oil and 25 tpd of carbon 45 and 80 tpd of sulfur dioxide 45a as reducing agents. The titanium concentrate is leached under a pressure of 635 psig for about 120 minutes while agitating the mixture.

The reacted mixture is filtered, washed and dried at 46 to provide 580 tpd product 47 of at least 95% $TiO_2$. The leach solution 48 obtained by filtration (4,500 tpd) will contain 300 tpd of iron in the form of ferrous sulfate which corresponds to a combined sulfuric acid content of 525 tpd.

The ferrous sulfate solution together with a supplemental amount of 315 tpd of sulfuric acid is fed to the nickel leaching autoclave 49 to which are added 16,200 tpd of ore slurry 50 at a solids content of 40 percent. The ore has a composition substantially the same as that set forth in Example 1. A total of 635 psig pressure is applied using steam 51 fed at 3,430 tpd and oxygen 52 fed at 36 tpd, the steam partial pressure being about 535 psig and the oxygen about 100 psig.

The total acid content of the mixture attributed to the solution from the titanium leach (which includes acid combined as iron sulfate) and the sulfuric acid supplement amounts to an acid-to-ore ratio of about 0.24 to 1 by weight. The oxygen oxidizes the ferrous sulfate to ferric sulfate which then hydrolyzes at the prevailing pressure, temperature and pH to provide additional free acid with the acid present to leach the nickel ore. The high pressure leach generally requires a residence time of about 90 minutes and results in 25,000 tpd of leach slurry 53 which is washed by countercurrent decantation 54 to provide solids 55 (tails) and nickel solution 56. The nickel may be recovered from the solution by any desirable method.

In carrying out the titanium leaching step, it is preferred that a carbonaceous reducing agent, such as carbon, be added to assure that substantially all of the iron is reduced to the ferrous state so that the iron will go into solution and thus be capable of being separated from the insoluble hydrated titanium oxide. If the iron is not reduced, a portion of it may hydrolyze and contaminate the titanium product. The oil added is preferably an organic flotation reagent of the type oleic acid, pine oil, fuel oil, nonanoic acid and the like. Such flotation reagents include frothing agents, collecting agents and modifying agents. It is believed that the flotation agent serves to disperse the reacting slurry. The combined use of $SO_2$ (note 45a of FIG. 3) in conjunction with the carbonaceous reducing agent 45 (carbon, coke and the like) is advantageous in that it assures conversion of the iron into the ferrous form which is soluble in the leach liquor. The pressure for titanium leaching may range from about 500 to 2,000 psig at temperatures ranging from about 240°C to 340°C. Preferably, the pressure may range from about 500 psig to 1,000 psig and the temperature from about 240°C to 290°C. The amount of sulfuric acid added should be at least sufficient to react with all of the ferrous iron present to form ferrous sulfate. A slight excess of acid may be added to provide a ferrous sulfate solution containing some free sulfuric acid.

As regards the conditions for leaching the nickel ore, the total pressure may range from about 410 psig to 1,200 psig, the total pressure being attributed to essentially steam and oxygen. Thus, within the total range of pressure, the oxygen partial pressure may range from about 10 psig to 400 psig, while the steam partial pressure may range from about 400 psig to as high as 800 psig, the temperature in the autoclave ranging from about 230°C to 270°C.

Depending upon the nature of the oxidic nickel ore, the amount of sulfuric acid equivalent may range on an acid-to-ore ration from about 0.15 to 0.4 parts by weight of acid to 1 part of weight of ore. By "sulfuric acid equivalent" is meant the acid attributable to the iron sulfate taken alone or together with any free sulfuric acid that may be present or which may be intentionally added along with the ferrous sulfate.

As illustrative of various acid-to-ore ratios, the following table is referred to:

TABLE 1

| H$_2$SO$_4$ Combined as FeSO$_4$ | Free H$_2$SO$_4$ Added | Total Acid (H$_2$SO$_4$ Equivalent) | Nickel Ore | Ratio H$_2$SO$_4$ Equivalent |
|---|---|---|---|---|
| 0.1 | 0.1 | 0.2 | 1 | 0.2:1 |
| 0.05 | 0.2 | 0.25 | 1 | 0.25:1 |
| 0.15 | 0.1 | 0.25 | 1 | 0.25:1 |
| 0.2 |  | 0.2 | 1 | 0.2:1 |
| 0.25 |  | 0.25 | 1 | 0.25:1 |
| 0.3 | 0.05 | 0.35 | 1 | 0.35:1 |
| 0.4 |  | 0.4 | 1 | 0.4:1 |
| 0.3 |  | 0.3 | 1 | 0.3:1 |

The pH of the final leach solution may range from about 0.2 to about 1.

As will be apparent from the table, the ferrous sulfate may be the total source of acid or part of it may be supplemented with free sulfuric acid. Thus, of the total acid required to effect leaching of substantially all of the nickel in the ore, the acid combined as iron sulfate may constitute anywhere from 10 to 100 percent, generally from about 25 percent to 100 percent, of the total acid required, with anywhere from 0 to 90 percent, e.g. 0 to 75 percent, of the total acid required being made up of supplemental acid.

The oxidic nickel material which may be treated in accordance with the invention includes lateritic ores of the limonite or serpentine type. Such ores contain an average of about 0.5 to 2% nickel, up to about 0.5% cobalt, up to about 50% or more of iron, up to about 10% silicon (as silica), up to about 5% aluminum, up to about 4% chromium, up to about 2% manganese, up to about 10% magnesium and the balance combined oxygen and the usual incidentals.

As will be apparent, the invention described herein enables the use of waste by-product solutions, chemicals, etc., the disposal of which normally presents an environmental pollution problem. Thus, in avoiding pollution, certain economic advantages may be obtained. For example, in the case of leaching nickel and cobalt ore, where the acid obtained by the hydrolysis of iron sulfate (i.e., ferric sulfate) is cheaper than the cost of new or free sulfuric acid, the economic benefits which accrue will be in proportion to the amount of iron sulfate recycled for use in the process. Thus, the greater the amount of waste iron sulfate used, the greater will be the economic advantages.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of high pressure leaching oxidic nickel-containing material with a solution comprising ferrous sulfate which comprises, establishing a slurry of said material in the finely divided state containing ferrous sulfate having a combined acid content calculated to provide free sulfuric acid such that the total acid present in the solution following hydrolysis is in stoichiometric excess of the sulfuric acid required to leach the oxidic nickel-containing material, leaching said slurry at superatmospheric pressure and elevated temperature under conditions in which the ferrous sulfate is oxidized to ferric sulfate, which upon hydrolysis at the prevailing conditions of pressure, temperature and pH provides the required amount of free sulfuric acid to leach a major portion of the nickel from said material, whereby to form a solution containing said major portion of nickel, and then separating the nickel-containing solution from the leached ore.

2. The method of claim 1, wherein the ferrous sulfate is oxidized by adding oxygen under pressure.

3. The method of claim 2, wherein the leaching pressure ranges from about 410 to 1,200 psig, wherein the temperature ranges from about 230 to 270°C, and wherein the oxygen partial pressure included within the leaching pressure ranges from about 10 to 400 psig.

4. The method of claim 1, wherein the total amount of acid present in solution provides a sulfuric acid equivalent-to-ore ratio by weight ranging from about 0.15 to 0.4 to 1.

5. The method of claim 4, wherein a major portion of the sulfuric acid equivalent is derived from the hydrolysis of ferric sulfate.

6. A method for the coordinate leaching of oxidic titaniferous iron-containing material and oxidic nickel-containing material by the sequential use of the same starting reagent which comprises, forming a slurry of said titaniferous material with sulfuric acid, the amount of said acid being at least sufficient to solubilize substantially the iron present and form iron sulfate, heating said slurry in an autoclave under superatmospheric pressure and elevated temperature for a time sufficient to solubilize the iron values present and convert the titanium values to substantially insoluble hydrated titanium oxide, separating the resulting iron sulfate solution from the insoluble hydrated titanium oxide, forming a slurry of the iron sulfate solution with oxidic nickel-containing material in the finely divided state, the amount of iron sulfate present having a combined sulfuric acid content such that the total acid present in solution following hydrolysis provides a sulfuric acid equivalent in stoichiometric excess of the sulfuric acid required to leach said oxidic nickel-containing material, leaching the slurry at superatmospheric pressure and elevated temperature with the iron sulfate in the form of ferric sulfate which upon hydrolysis at the prevailing conditions of pressure, temperature and pH provides the required amount of sulfuric acid necessary to leach at least a major portion of the nickel from the oxidic nickel-containing material, whereby to form a solution containing said major portion of nickel, and then separating the nickel-containing solution from the leached ore.

7. The method of claim 6, wherein the leaching pressure and temperature employed in the titanium leaching step ranges from about 500 psig to 1,000 psig and the temperature from about 240 to 290°C, and wherein the leaching pressure and temperature of the nickel leaching step ranges from about 410 psig to 1,200 psig and the temperature from about 230°C to 270°C.

8. The method of claim 7, wherein the total amount of acid present in solution provides a sulfuric acid equivalent-to-ore ratio which ranges from about 0.15 to 0.4 to 1.

9. A method for the coordinate leaching of oxidic titaniferous iron-containing material and oxidic nickel-containing material by the sequential use of the same starting reagent which comprises, leaching said titaniferous material in the finely divided state at superatmospheric pressure and elevated temperatures with sulfuric acid under conditions to produce a solution of ferrous sulfate which is thereafter separated from solids containing insoluble hydrated titanium oxide, forming a slurry of said ferrous sulfate solution with the said oxidic nickel-containing material in the finely divided state, the amount of ferrous sulfate present having a combined sulfuric acid content such that the total acid present in solution following hydrolysis provides a sulfuric acid equivalent in stoichiometric excess of the sulfuric acid required to leach said oxidic nickel-containing material, leaching said slurry at superatmospheric pressure and elevated temperature under conditions in which the ferrous sulfate is oxidized to ferric sulfate which upon hydrolysis at the prevailing conditions of pressure, temperature and pH provides the required amount of free acid necessary to leach at least a major portion of the nickel from the oxidic nickel-containing material, whereby to form a solution containing said major portion of nickel, and then separating the nickel-containing solution from the leached ore.

10. The method of claim 9, wherein the titaniferous material is leached in the presence of a reducing agent, the reducing agent being at least sufficient to reduce ferric iron present to ferrous iron.

11. The method of claim 10, wherein the leaching pressure and temperature of the titanium leaching step range from about 500 psig to 1,000 psig and the temperature from about 240°C to 290°C.

12. The method of claim 10, wherein the leaching pressure and temperature of the nickel leaching step ranges from about 410 psig to 1,200 psig and the temperature from about 230°C to 270°C.

13. The method of claim 12, wherein the ferrous sulfate in the nickel leaching step is oxidized to ferric sulfate by the addition of oxygen under superatmospheric pressure.

14. The method of claim 13, wherein the oxygen partial pressure within the range of the leaching pressure ranges from about 10 psig to 400 psig.

15. The method of claim 12, wherein the total amount of acid present in solution provides a sulfuric acid equivalent-to-ore ratio by weight ranging from about 0.15 to 0.4 to 1.

* * * * *

UNITED STATES PATENT OFFICE
CERTIFICATE OF CORRECTION

Patent No. 3,761,566          Dated September 25, 1973

Inventor(s) Eugene J. Michal

It is certified that error appears in the above-identified patent and that said Letters Patent are hereby corrected as shown below:

On the cover sheet item [45] "September 25, 1970" should read -- September 25, 1973 --.

Signed and sealed this 26th day of February 1974.

(SEAL)
Attest:

EDWARD M. FLETCHER, JR.          C. MARSHALL DANN
Attesting Officer                Commissioner of Patents